United States Patent
Heckel et al.

(10) Patent No.: US 7,207,921 B2
(45) Date of Patent: Apr. 24, 2007

(54) TRANSMISSION COLD START BURST RATTLE REDUCTION

(75) Inventors: Aaron C. Heckel, South Lyon, MI (US); Thomas M. Sherman, Pinckney, MI (US)

(73) Assignee: General Motors Corporation, Detroit, MI (US)

( * ) Notice: Subject to any disclaimer, the term of this patent is extended or adjusted under 35 U.S.C. 154(b) by 256 days.

(21) Appl. No.: 10/939,552

(22) Filed: Sep. 13, 2004

(65) Prior Publication Data

US 2006/0058154 A1    Mar. 16, 2006

(51) Int. Cl.
    *F16H 59/60* (2006.01)
(52) U.S. Cl. .......................... 477/97; 477/156
(58) Field of Classification Search ................ 477/97, 477/98, 156
    See application file for complete search history.

(56) References Cited

U.S. PATENT DOCUMENTS 5,115,694 A * 5/1992 Sasaki et al. ............... 477/98
5,261,295 A * 11/1993 Iwanaga et al. ............. 477/98
6,840,889 B2 * 1/2005 Aoki et al. ................ 477/156

FOREIGN PATENT DOCUMENTS

| JP | 60-179552 | * | 9/1985 | ............. 477/98 |
| JP | 4-66337 | * | 3/1992 | ............. 477/98 |

* cited by examiner

*Primary Examiner*—Ha Ho
(74) *Attorney, Agent, or Firm*—Christopher DeVries

(57) ABSTRACT

A vehicle having an engine that drives a transmission includes a pump that provides fluid to the transmission and a temperature sensor that monitors a temperature of the fluid. The temperature sensor generates a temperature signal. A control module receives the temperature signal and operates the pump to provide the fluid at a first pressure when the temperature signal is below an upper temperature limit. The control module operates the pump to provide the fluid at a second pressure when the temperature signal is above the upper temperature limit.

14 Claims, 2 Drawing Sheets

TRANSMISSION COLD START BURST RATTLE REDUCTION

FIELD OF THE INVENTION

The present invention relates to automatic transmissions, and more particularly to reducing burst rattle of an automatic transmission during cold start.

BACKGROUND OF THE INVENTION

Vehicles commonly include an automatic transmission that is driven by a powerplant. Powerplants produce drive torque that is transferred to the automatic transmission and can include, but are not limited to, internal combustion engines, electric machines or combinations thereof (e.g., hybrid powerplant). The automatic transmission transfers the drive torque to a driveline at varying gear ratios to propel the vehicle.

The automatic transmission includes a plurality of gear sets and clutches. The clutches are hydraulically actuated to selectively engage the gear sets to provide a desired gear ratio. Pressurized hydraulic fluid is provided by a pump. Typically, the pump is driven by the powerplant and compresses the hydraulic fluid drawn in from a sump.

When a vehicle sits for an extended period of time (i.e., soak), the hydraulic fluid completely drains into the sump. In colder ambient temperatures (e.g., 30° F. and lower), the hydraulic fluid is cooled and becomes more viscous. When the powerplant is initially cranked after an extended soak in a colder ambient environment, the pump can cavitate as a result of the highly viscous hydraulic fluid. The cavitation generates a rattle or noise that can be sensed by the vehicle operator, which is undesirable.

SUMMARY OF THE INVENTION

Accordingly, the present invention provides a vehicle having an engine that drives a transmission. The vehicle includes a pump that provides fluid to the transmission and a temperature sensor that monitors a temperature of the fluid. The temperature sensor generates a temperature signal. A control module receives the temperature signal and operates the pump to provide the fluid at a first pressure when the temperature signal is below an upper temperature limit. The control module operates the pump to provide the fluid at a second pressure when the temperature signal is above said upper temperature limit.

In one feature, the control module operates the pump to provide the fluid at the first pressure when the temperature signal is within a range defined between the upper temperature limit and a lower temperature limit.

In one feature, the first pressure is less than the second pressure.

In another feature, an engine diagnostic system selectively sets error flags. The control module operates the pump to provide the fluid at the second pressure when an error flag is set.

In another feature, the control module operates the pump to provide the fluid at the first pressure when the transmission is in one of a neutral range and a park range.

In another feature, the control module operates the pump to provide said fluid at the first pressure for a threshold time and operates the pump to provide the fluid at the second pressure when the threshold time expires.

In still another feature, the first pressure is constant.

In yet another feature, the second pressure varies based on vehicle operating parameters.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
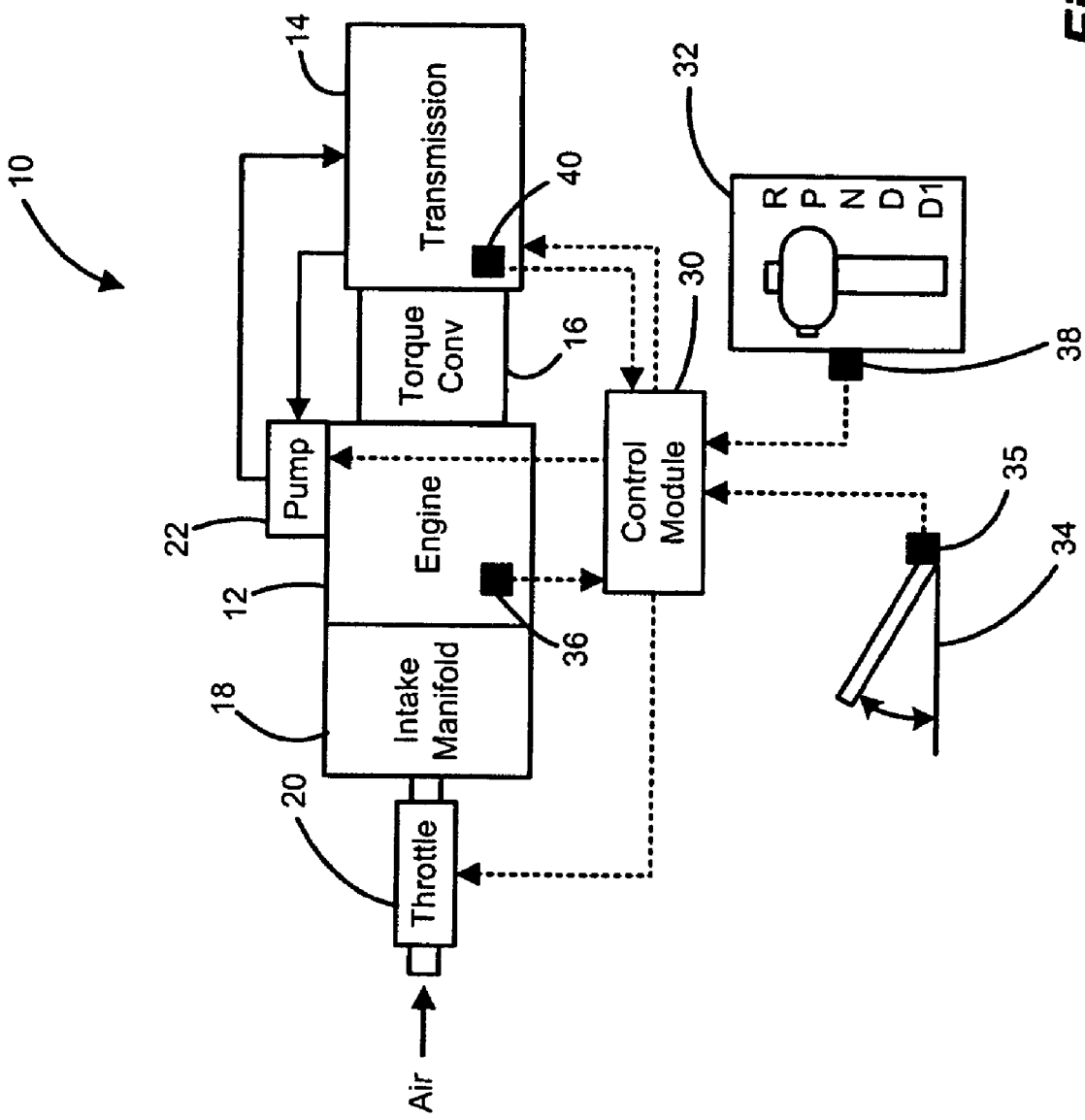
FIG. 1 is a schematic illustration of a vehicle implementing the transmission cold start control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary vehicle 10 includes an engine 12 that drives an automatic transmission 14 through a torque converter 16. The torque converter 16 enables start-off, provides torque multiplication and absorbs harmonic vibrations within the vehicle drivetrain. Air is drawn into an intake manifold 18 of the engine through a throttle 20. The air is combusted with fuel in cylinders of the engine 12 to produce drive torque. The engine 12 drives a pump 22 that draws low pressure hydraulic fluid from a transmission sump and compresses the hydraulic fluid. The hydraulic fluid is provided to the transmission 14 to enable shifting of the transmission components, as described in further detail below.

The transmission 14 includes gear sets (not shown) that selectively interconnect input and output shafts (not shown). Typically, the gear sets include planetary gear sets selectively manipulated by clutches (not shown) to control the transmission gear ratio. Clutch actuation and gear shifting are enabled using the pressurized hydraulic fluid provided by the pump 22. The input shaft is coupled to the engine 12 via the torque converter 16. The output shaft is coupled to a drive shaft (not shown).

A control module 30 defines gear selection and shift points and regulates demand-response shifting of the transmission 14. Demand-response shifting is based on a shift program that is selected by the driver using a selector 32, a position of an accelerator 34, engine operating conditions, vehicle speed and other vehicle operating conditions. A position sensor 35 generates an accelerator position signal that is communicated to the control module 30. The drive selector 32 enables a vehicle operator to select a particular range including, but not limited to, park (P), drive (D), neutral (N) and reverse (R).

The control module 30 commands hydraulic actuation of the clutches based on the shift program. The control module 30 actuates gear selection and modulates the clutch pressure electronically in accordance with the torque flowing through the transmission 14. The control module 30 communicates with an engine speed sensor 36 that generates an engine speed signal and a position sensor 38 that generates a gear selector position signal. The control module 30 also communicates with a sump temperature sensor 40 that generates a temperature signal based on the sump temperature of the hydraulic fluid ($T_{FLUID}$).

Under normal operating conditions, the control module 30 operates the pump 22 to provide the hydraulic fluid at a normal pressure ($P_{NORMAL}$). $P_{NORMAL}$ is a variable pressure that varies based on vehicle operating conditions including, but not limited to, engine speed, transmission range and present gear ratio. Under cold start conditions, the control module 30 executes the transmission cold start control of the present invention to alleviate burst rattle generated by the pump 22. More particularly, the control module 30 operates the pump 22 to provide the hydraulic fluid to the transmission 14 at a reduced pressure ($P_{RED}$). $P_{RED}$ is a fixed value that is generally less than pressure range within which $P_{NORMAL}$ varies. Cold start is generally defined as $T_{FLUID}$ being within a specified temperature range defined by lower and upper temperature limits, $T_{UPPER}$ and $T_{LOWER}$, respectively (e.g., −40° C. to 20° C., respectively), at engine crank. The control module 30 executes the cold start transmission control when there are no overriding priorities, the transmission 14 is in either the P or N ranges and $T_{FLUID}$ is within the specified temperature range. Overriding priorities include diagnostics errors indicating pressure control problems, such that the transmission 14 is operating in a non-normal mode at engine crank.

Figure 2:
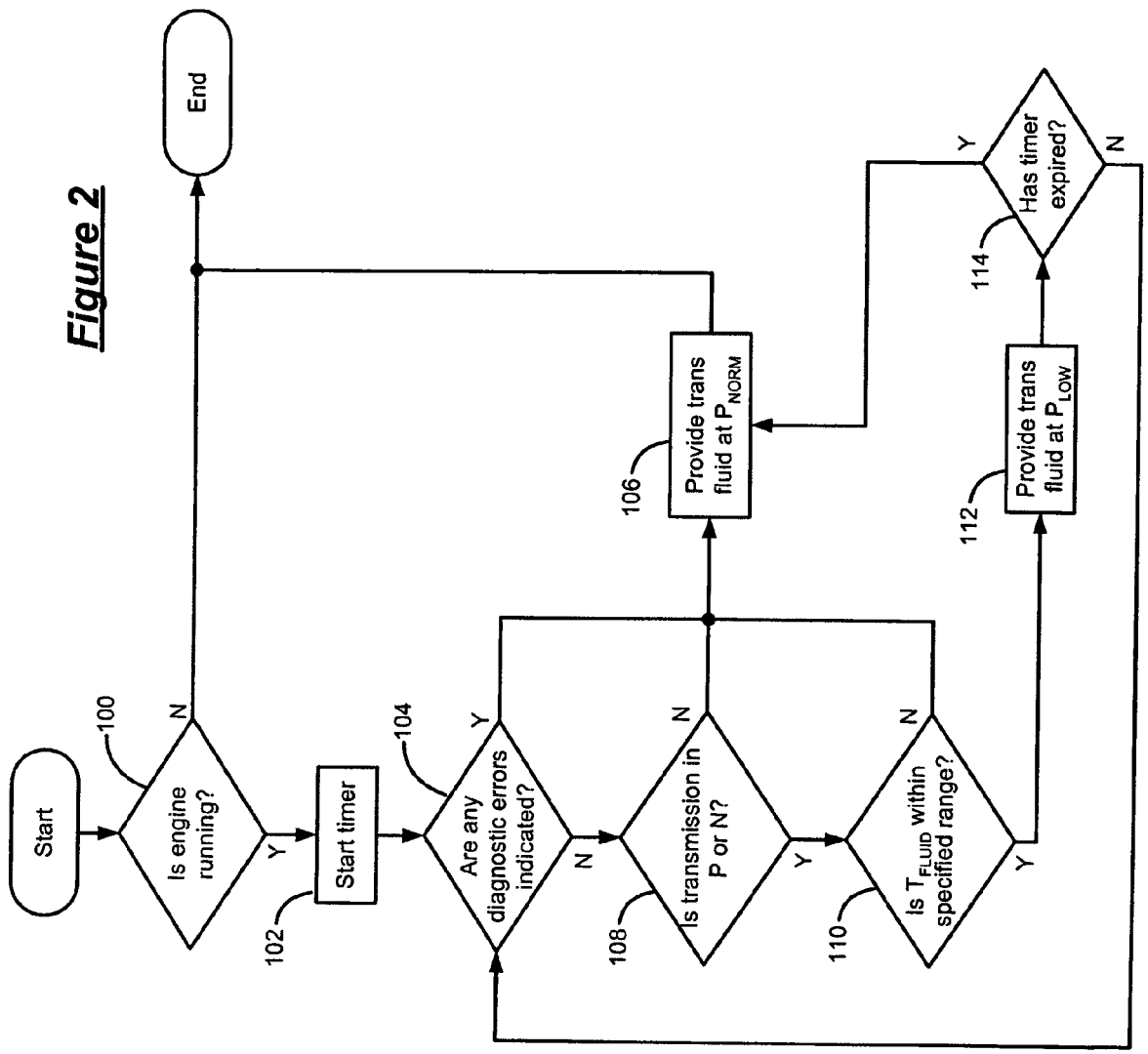
FIG. 2 is a flowchart illustrating steps performed by the transmission cold start control system of present invention.

Referring now to FIG. 2, steps executed by the transmission cold start control system will be described in detail. In step 100, control determines whether the engine 12 is running. If the engine 12 is not running, control ends. If the engine 12 is running, control starts a timer in step 102. In step 104, control determines whether there are any diagnostic errors that would effect pressure control (e.g., force motor failure diagnostics, range position diagnostics and the like). If there are diagnostic errors, control continues in step 106. If there are no diagnostic errors, control continues in step 108.

In step 108, control determines whether the transmission 14 is in either the park range (P) or the neutral range (N) based on the gear selector position signal. If the transmission 14 is in neither the P range nor the N range, control continues in step 106. If the transmission is in either the P range or the N range, control continues in step 110. In step 110, control determines whether $T_{FLUID}$ is within a specified range (i.e., between $T_{LOWER}$ and $T_{UPPER}$). If $T_{FLUID}$ is not within the specified range, control continues in step 106. If $T_{FLUID}$ is within the specified range, control continues in step 112.

Control operates the pump to provide the hydraulic fluid at $P_{LOW}$ in step 112. In step 114, control determines whether the timer has expired. If the timer has not expired, control loops back to step 104. If the timer has expired, control continues in step 106. In step 106, control operates the pump 22 to provide the hydraulic fluid at $P_{NORMAL}$.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A vehicle having an engine that drives a transmission, comprising:
    a pump that provides fluid to said transmission;
    a temperature sensor that monitors a temperature of said fluid and that generates a temperature signal;
    a control module that receives said temperature signal, that operates said pump to provide said fluid at a first pressure when said temperature signal is below an upper temperature limit and that operates said pump to provide said fluid at a second pressure when said temperature signal is above said upper temperature limit, wherein said first and second pressures are greater than zero; and
    an engine diagnostic system that selectively sets error flags, wherein said control module operates said pump to provide said fluid at said second pressure when an error flag is set.

2. The vehicle of claim 1 wherein said control module operates said pump to provide said fluid at said first pressure when said temperature signal is within a range defined between said upper temperature limit and a lower temperature limit.

3. The vehicle of claim 1 wherein said first pressure is less than said second pressure.

4. The vehicle of claim 1 wherein said control module operates said pump to provide said fluid at said first pressure when said transmission is in one of a neutral range and a park range.

5. The vehicle of claim 1 wherein said control module operates said pump to provide said fluid at said first pressure for a threshold time and operates said pump to provide said fluid at said second pressure when said threshold time expires.

6. The vehicle of claim 1 wherein said first pressure is constant.

7. The vehicle of claim 1 wherein said second pressure varies based on vehicle operating parameters.

8. A method of reducing cavitation in a pump that provides fluid to a transmission, comprising:
    determining a temperature of said fluid;
    operating said pump to provide said fluid at a first pressure when said temperature is below an upper temperature limit;
    operating said pump to provide said fluid at a second pressure when said temperature is above said upper temperature limit, wherein said first pressure and said second pressure are greater than zero; and
    setting an error flag based on an engine system diagnostic, wherein said pump is operated to provide said fluid at said second pressure when said error flag is set.

9. The method of claim 8 wherein said pump is operated to provide said fluid at said first pressure when said temperature is within a range defined between said upper temperature limit and a lower temperature limit.

10. The method of claim 8 wherein said first pressure is less than said second pressure.

11. The method of claim 8 further comprising operating said pump to provide said fluid at said first pressure when said transmission is in one of a neutral range and a park range.

12. The method of claim 8 further comprising:
    operating said pump to provide said fluid at said first pressure for a threshold time; and operating said pump to provide said fluid at said second pressure when said threshold time expires.

13. The method of claim 8 wherein said first pressure is constant.

14. The method of claim 8 wherein said second pressure varies based on vehicle operating parameters.

* * * * *